United States Patent
Jensen (10) Patent No.: US 6,572,303 B2
(45) Date of Patent: Jun. 3, 2003

(54) ARRANGEMENT FOR MOUNTING LOADING PLATFORM SYSTEMS ON THE FRAME OF TRAILERS, SEMI-TRAILERS AND OTHER VEHICLES

(75) Inventor: Jens Herman Jensen, Ulfborg (DK)

(73) Assignee: Sörensen Hydraulik, Zweigniederlassung, Ulfborg, Filial Sörensen Hydraulik GmbH, Tyskland, Ulfborg (DK)

( * ) Notice: Subject to any disclaimer, the term of this patent is extended or adjusted under 35 U.S.C. 154(b) by 0 days.

(21) Appl. No.: 09/834,185

(22) Filed: Apr. 13, 2001

(65) Prior Publication Data

US 2002/0118995 A1 Aug. 29, 2002

(30) Foreign Application Priority Data

Feb. 24, 2001 (EP) .............................. 01103401

(51) Int. Cl.[7] .................................. B60P 1/44
(52) U.S. Cl. .................... 403/24; 414/557; 414/917
(58) Field of Search ................. 414/557, 917; 403/24, 363

(56) References Cited

U.S. PATENT DOCUMENTS

| 2,348,993 A | * | 5/1944 | Novotney | 403/363 |
|---|---|---|---|---|
| 2,801,864 A | * | 8/1957 | Raney et al. | 403/363 |
| 3,534,874 A | | 10/1970 | Long | |
| 3,700,123 A | * | 10/1972 | Corley, Jr. | 414/557 |
| 4,078,676 A | * | 3/1978 | Mortenson | 414/557 |
| 5,297,888 A | * | 3/1994 | Nehls | 403/363 |
| 6,082,958 A | * | 7/2000 | Jensen | 414/557 |

FOREIGN PATENT DOCUMENTS

| EP | 0 786 374 | 7/1997 |
|---|---|---|
| GB | 1 268 958 | 3/1972 |
| WO | WO 97/09197 | 3/1997 |
| WO | WO 98/08728 | 3/1998 |

* cited by examiner

Primary Examiner—Lynne H. Browne
Assistant Examiner—Kenneth Thompson
(74) Attorney, Agent, or Firm—Klaus J. Bach (57) ABSTRACT

In an arrangement for mounting a loading platform system on the chassis or frame of a vehicle having longitudinal vehicle frame members disposed in spaced relationship, a transverse support frame structure having an adjustable transverse length is provided permitting adaptation of the transverse support frame structure to the distance between the longitudinal vehicle frame members for mounting the transverse support frame structure to the longitudinal vehicle frame members. The transverse support frame structure includes means for supporting the loading platform system.

18 Claims, 6 Drawing Sheets

ARRANGEMENT FOR MOUNTING LOADING PLATFORM SYSTEMS ON THE FRAME OF TRAILERS, SEMI-TRAILERS AND OTHER VEHICLES

BACKGROUND OF THE INVENTION

The invention relates to an arrangement for mounting loading platform systems on the chassis or frame of trailers, semi-trailers and other vehicles, wherein the chassis or frame includes at least two spaced frame members.

As disclosed for example in EP-A-0 808 747 (U.S. Ser. No. 09/635,963), loading platform systems, which may be manufactured as complete units, are mounted on chassis-frame structures of vehicles by means of relatively complicated structures. The loading platform systems are never manufactured by the vehicle manufacturers and are provided for different types of vehicles. The vehicle frames are generally also different as there are, unfortunately, no standards for distances between the frame members of the various vehicles on which loading platform systems are to be mounted. Although, among European manufacturers, a certain standard for the distances between the frame members of the chassis-frame arrangements of vehicles has been established, there are still differences between different vehicle sizes. It is therefore generally necessary to individually adapt the loading platform system to different frame member distances of the different chassis-frame arrangements by way of relatively expensive adaptation structures and procedures in order to mount a loading platform system to the frame members of a vehicle.

In trailers pulled by tractors or semi-trailers, on which a loading platform system is to be mounted, the distance between the frame members forming the trailer support structure is not standardized in any way. On one hand, the distance between frame members of trailers and semi-trailers is very different from the frame member distances of the trucks; on the other hand the distance between the frame members of trailers and semi-trailers is substantially greater than that between the frame members of the trucks or tractors pulling the trailers. But also the distances between the frame members of trailers and semi-trailers are different from one manufacturer to the other, even within the European community, to such a degree that, in addition to expensive adaptation structures, expensive support structure must be installed for bridging the relatively large distances between the frame members.

These adaptation structures, provided in addition to the support structures which bridge the large distances between the frame members and on which the loading platform is supported by way of the adaptation structures, are members which must also be especially provided or adapted to a particular vehicle. Such adaptation is partially performed by the manufacturers of the trailers and semi-trailers and partially by the manufacturer of the loading platform system. In any case, it requires substantial efforts and a substantial amount of time so that the adaptation expenses approach the costs of the highly complex loading platform system itself. And this of course, is unacceptable. In this connection, sometimes the chassis frame arrangement needs to be changed during the installation of the loading platform system which may even result in a weakening of the chassis-frame structure. Even if this should not be the case, technical expert inspection and approval of the change by an appropriate government agency or other authorities is required. This further increases the expenses for the installation of a loading platform system.

It is therefore the object of the present invention to provide a loading platform system which can be easily and rapidly mounted on chassis-frame structures of trailers, semi-trailers and other vehicles with differently spaced frame members and without the need for changes to the frame and chassis structures of the vehicles. The system is to be simple in design and relatively inexpensive to manufacture and install. The system should be adapted to be installed by the manufacturers of trailers semi-trailers and other vehicles or it may be installed later as an accessory.

SUMMARY OF THE INVENTION

In an arrangement for mounting a loading platform system on the chassis or frame of a vehicle having longitudinal vehicle frame members disposed in spaced relationship, a transverse support frame structure having and adjustable transverse length is provided permitting adaptation of the transverse support frame structure to the distance between the longitudinal vehicle frame members for mounting the transverse support frame structure to the longitudinal vehicle frame members. The transverse support frame structure includes means for removably supporting the loading platform system.

The advantage of the arrangement according to the invention resides essentially in the fact that the transverse support frame structure is width-adjustable so that it can be easily and rapidly adapted to the different distances between the frame members of the chassis-frames of trailers, semi-trailers and other vehicles. As a result, the different design-distances between the frame members of vehicles of different manufacturers are no longer of grave consequences. The length-adjustable transverse elements are furthermore of simple design and can be manufactured at relatively low costs since only one uniform transverse frame structure, which fits all vehicles, is to be provided and kept in stock. Any distance between the frame members of chassis-frame systems of commercially available trailers, semi-trailers and other vehicles can be accommodated with the transverse frame structure according to the invention. Expensive adaptation structures and additional support structures, which bridge the space between the frame members and on which the adaptation structures are mounted are eliminated. There is also no need for a modification of the frame members to permit the mounting of the loading platform system.

In an advantageous embodiment of the invention the transverse frame structure consists of at least two transverse frame members which are disposed in spaced relationship so that, with a sufficiently large spacing of the transverse frame members from each other, the forces resulting from the weight of the loading platform system and the load disposed on the loading platform during operation of the loading platform system as well as the resulting torque, are transferred to the frame members of the vehicle frame in an elegant manner.

The transverse frame members forming the transverse frame structure may be in the form of tubes of any cross-sectional shape. Preferably, however, the transverse frame members have a U-shaped cross-section. The transverse frame members should provide for maximum stability with minimal weight. Tubular or U-shaped unfinished frame members are available commercially in any size and wall thickness so that expensive especially manufactured frame structures are not required. As a result, the transverse frame structure can be inexpensively manufactured. The unfinished frame members must only be cut to size for use in the construction of the transverse frame structure.

The length-adjustability of the transverse frame members can be achieved for tubular frame members by arranging the tubular sections telescopically within one another. For U-shaped frame members, two-different sizes may be selected such that one of two frame member sections is nested in the other that is the U-shaped frame member of greater inner width forms a channel in which the U-shaped frame member section of smaller width is snugly received and in which it is longitudinally slidable.

In a particularly advantageous embodiment of the invention, the transverse frame structure comprises at least two, preferably three, transverse frame member sections which are slidable relative to each other for adjustment of the transverse frame structure to the distance between the vehicle frame members. With three transverse frame member sections, the two outer sections can be attached to the vehicle frame members while the inner frame member section can be centered between the vehicle frame members. In this way, the loading platform system can be easily properly positioned in the lateral center of the trailer, semi-trailer or other vehicle.

The transverse frame structure may be attached to the vehicle frame members in any suitable manner, for example, by clamps or by bolts. The transverse frame members however are preferably provided at opposite ends with a mounting structure, which may be a plate-like mounting flange.

Although, after adjusting the transverse frame structure to the distance between the vehicle fame members, the transverse frame structure could be welded to the vehicles frame members—which procedure is acceptable only under certain conditions—it is advantageous if the mounting structure includes a plurality of holes so that the transverse frame structure can be removably attached to the vehicle frame members by bolts. Corresponding holes in the vehicle frame members could already be provided by the manufacturers of the vehicles. Of course, the respective holes could also be drilled by the installer of the loading platform system.

In another advantageous embodiment, two spaced transverse frame members may be joined by two spaced connecting elements by way of which the loading platform system is mounted to the transverse frame members. The connecting elements may be integral parts of the loading platform system as it is described in EP-A-0 808 747. In this case, the transverse frame members may be supplied already attached to the connecting elements. They could be attached to the connecting elements during manufacture of the loading platform system. With a three-section transverse frame member, the connecting elements, for example, are mounted to the center sections of the transverse frame members. For mounting the loading platform system to a vehicle frame, the two outer sections of the transverse frame members then only need to be position-adjusted so as to fit the transverse frame member between the longitudinal vehicle frame members.

The removable mounting arrangement of the connecting elements or, respectively, of the whole loading platform system by the provision of bolt connections represents one possible solution. In another very advantageous embodiment, the connecting elements and, together therewith, the loading platform system, are connected to the transverse frame elements by locking structures by which the connecting elements and the transverse frame elements can be firmly interlocked. In this way, the loading platform system can be mounted to the transverse frame members without the use of any tools, that is, after mounting of the transverse frame members to the vehicle frame members, the loading platform can be mounted to the vehicle without the use of tools.

In the embodiment in which the connecting elements are provided as part of the loading platform system, the connecting elements may be mounted to the transverse frame members by bolt connections rather than by welding. Such an arrangement facilitates servicing of the loading platform system or its replacement as it can easily by removed and reinstalled for service or for the repair of damages.

Since only relatively small forces are effective on the loading platform in the longitudinal direction of the transverse frame members and the distance between the vehicle frame members is predetermined by the vehicle design, no extensive means are needed to maintain the transverse frame members at the length to which they have been adjusted for a particular vehicle. To permit proper length adjustment of the transverse frame members, the transverse frame member sections are preferably provided with a plurality of holes by way of which the transverse frame member sections can be bolted together so as to provide for the desired transverse frame member length.

The invention will become more readily apparent from the following description of a particular embodiment thereof on the basis of the accompanying drawings.

DESCRIPTION OF A PREFERRED EMBODIMENT

Figure 1:
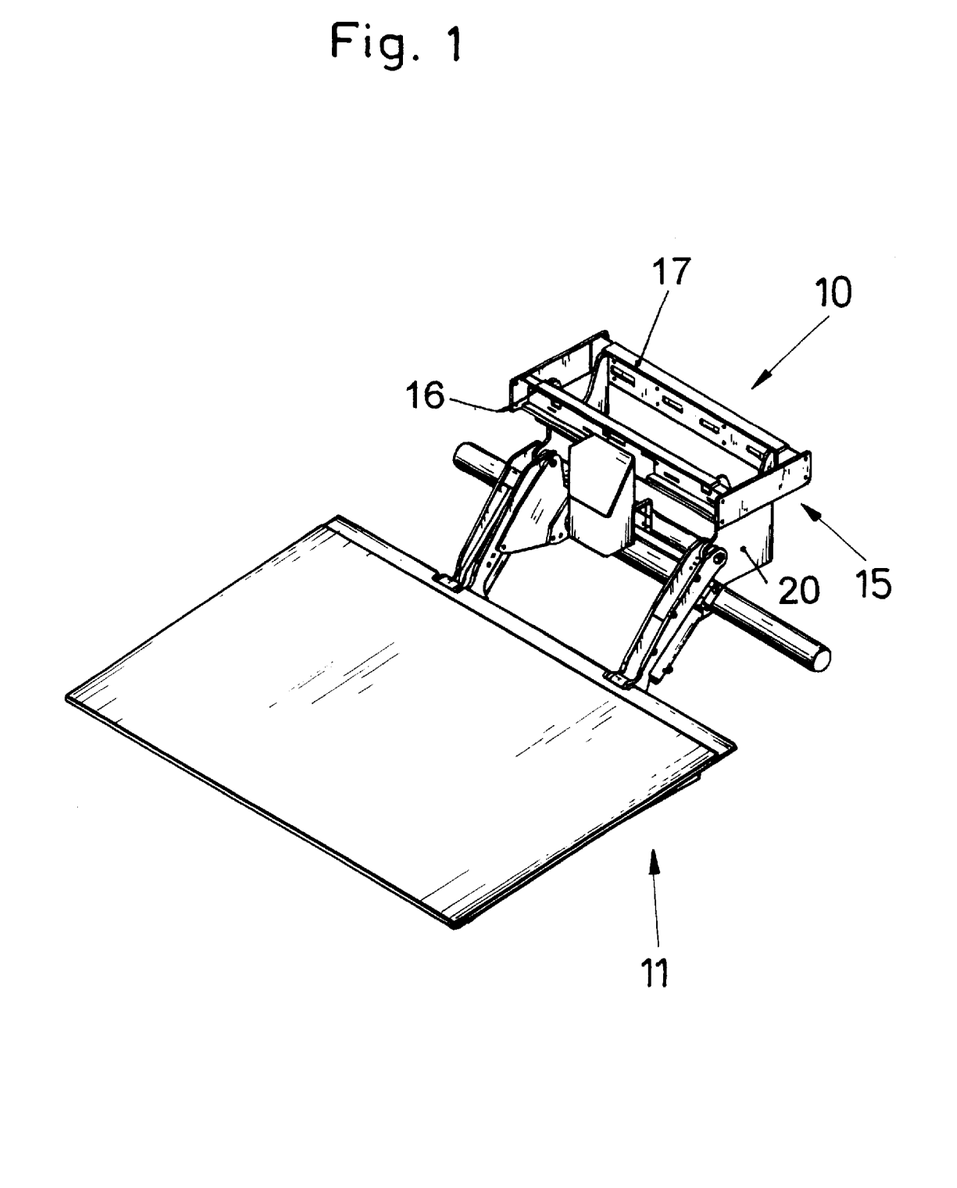
FIG. 1 is a perspective view of a loading platform system, which includes the mounting structure for mounting the system to a vehicle frame.

FIG. 1 shows a loading platform system 11, which is connected to a mounting arrangement 10 according to the present invention. A trailer, a semi-trailer or another vehicle on which the loading platform system 11 is mounted by way of the mounting arrangement 10 is not shown in FIG. 1 for clarity reasons. With respect to the design and operation of the loading platform system reference is made to EP-A-0 808 747 (U.S. Ser. No. 09/635,963) where such a loading platform system is described in detail and to which reference is made for detailed explanation. The operation of the loading platform system as such therefore does not need to the described herein.

Figure 2:
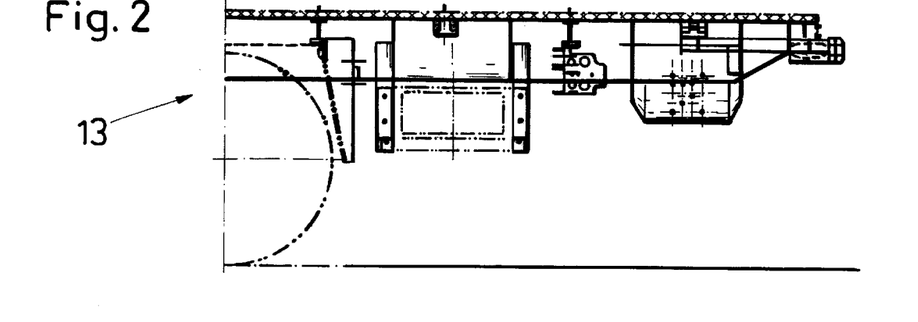
FIG. 2 is a side view of the rear part of a trailer, semi-trailer or other vehicle including an adaptation structure as used in the prior art for mounting a loading platform system to a vehicle.
Figure 3:
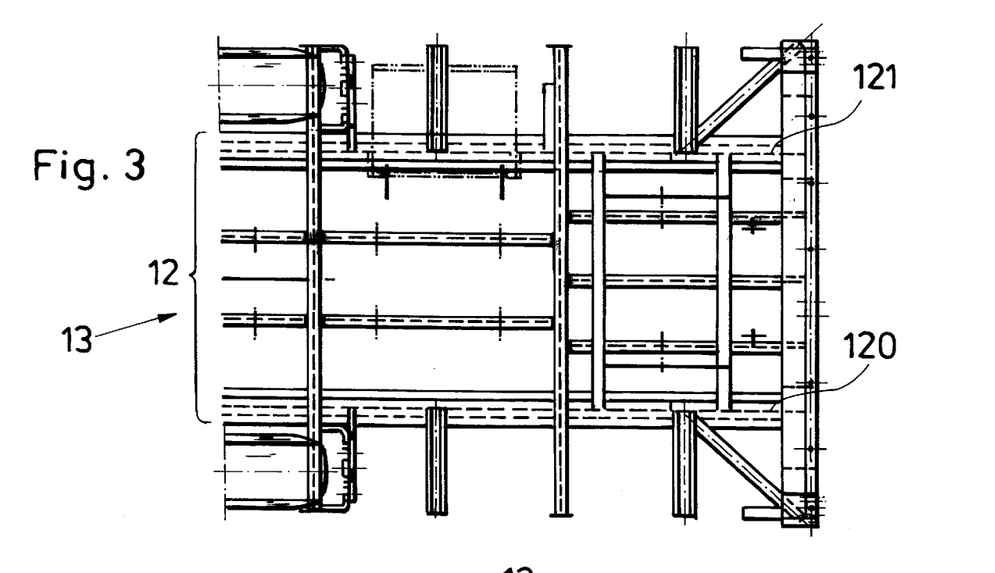
FIG. 3 is a top view of the rear part of a vehicle with the mounting structure according to the invention being indicated between the vehicle frame members.
Figure 4:
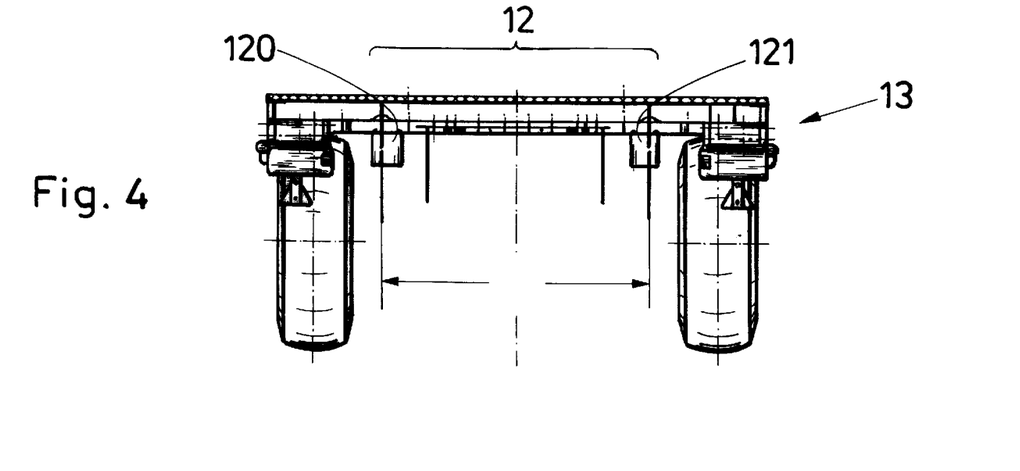
FIG. 4 is a schematic view of a vehicle from the rear for indicating the distance between two vehicle frame members between which the transverse frame members are mounted.
Figure 5:
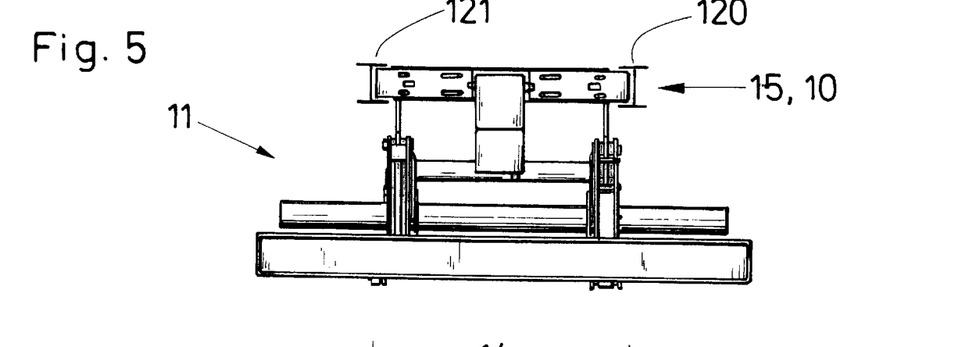
FIG. 5 is a rear view showing a loading platform system mounted to the frame members of a vehicle by way of the transverse frame members.
Figure 6:
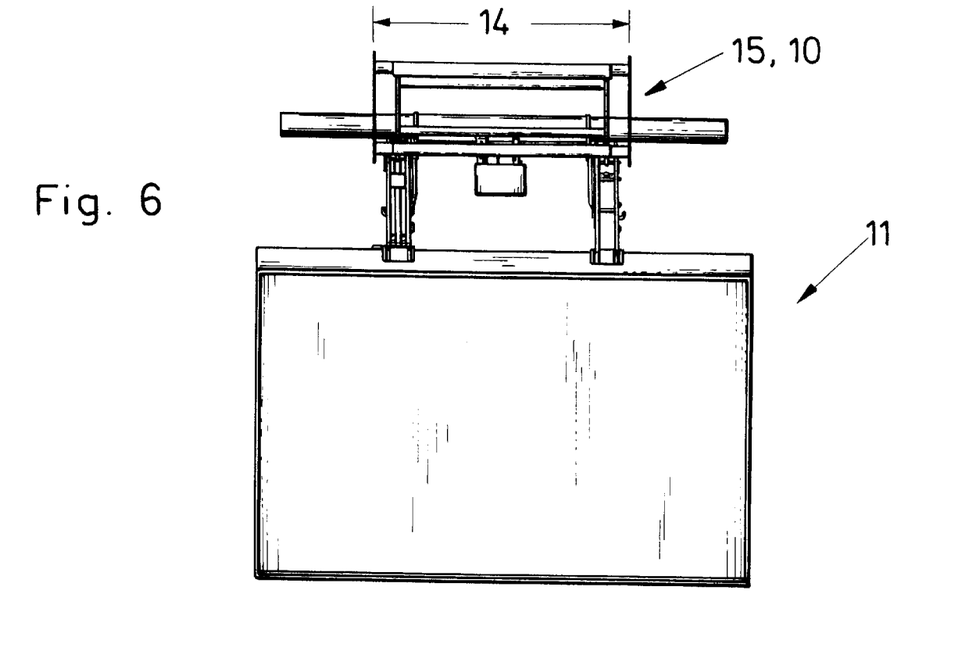
FIG. 6 is a top view of the arrangement as shown in FIG. 5.
Figure 7:
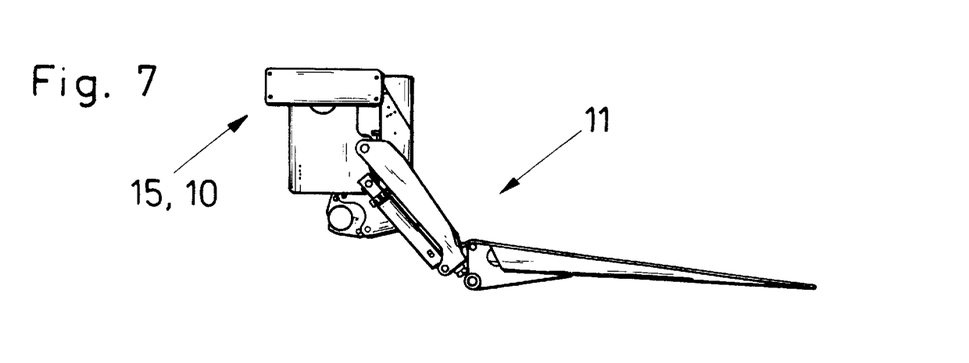
FIG. 7 is a side view of the arrangement as shown in FIG. 6, wherein the loading platform system is shown mounted on the connecting members.
Figure 8:
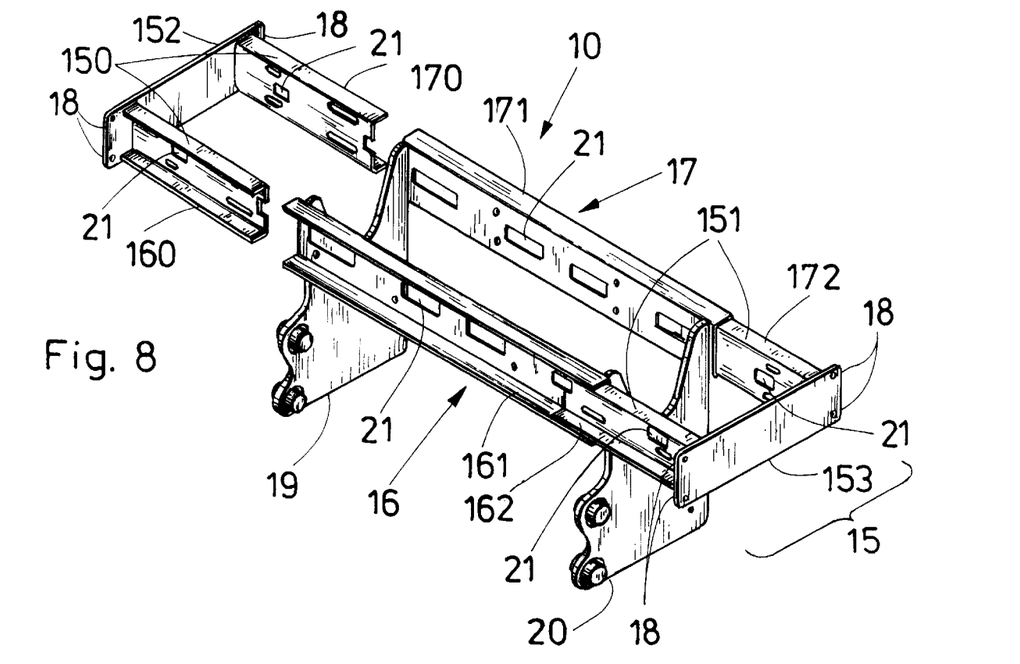
FIG. 8 is a perspective view of a frame structure including two transverse frame elements with center sections on which part of the loading platform system is mounted and the end sections pulled out of the center sections.
Figure 9:
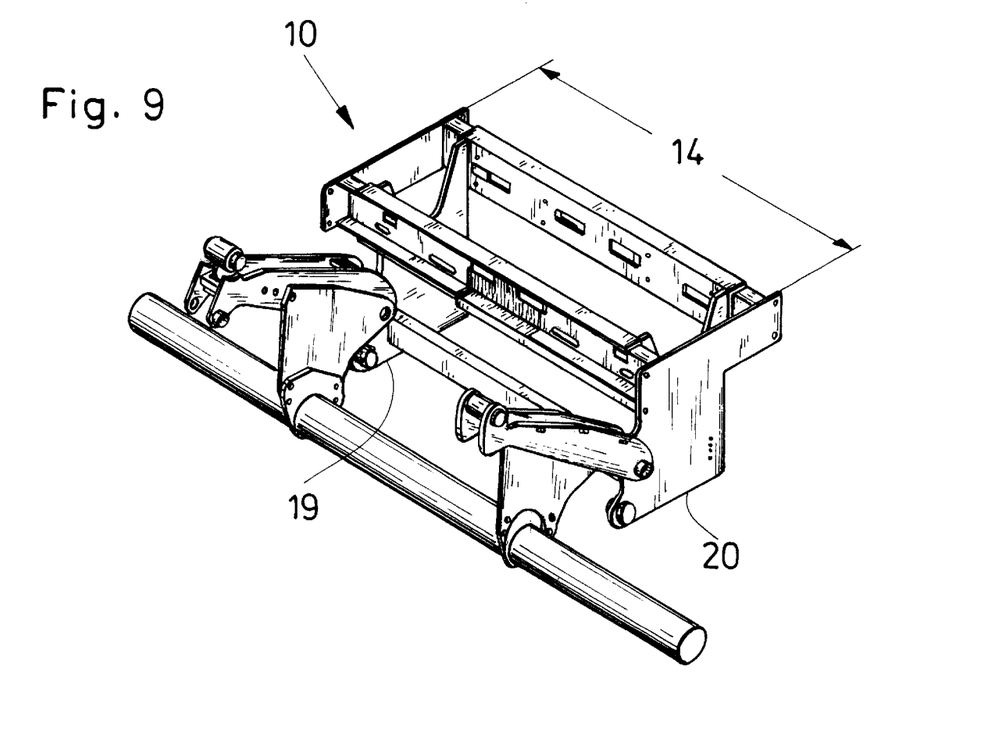
FIG. 9 is a view like that of FIG. 8, wherein the end sections of the transverse frame members are position-adjusted for a particular vehicle frame member distance.

FIGS. 2–4 show schematically the rear end of a vehicle 13 having longitudinal frame members to which the mounting arrangement 10 may be attached. The loading bed of the vehicle 13 is not shown. It is noted that the mounting arrangement 10 can be used with various types of vehicles (trailers, semi-trailers, trucks). The term vehicle is intended to include these and other vehicles requiring the lifting of loads whether they are trailers or self-propelled vehicles such as trucks.

The mounting arrangement 10 is mounted to the chassis/ frame structure 12 of the vehicle 13. The chassis/frame structure 12 comprises essentially two support frame members 120, 121, which are disposed in spaced relationship, see FIGS. 3 and 4. The two frame members 120, 121 are disposed at a distance from each other which, in trailers and semi-trailers, is generally—but not always—greater than in trucks or the tractors of the semi-trailer. The distances 14 between the frame members are generally also different in similar products of different manufacturers. The mounting of the loading platform system 11 is therefore achieved by the mounting arrangement described herein, which mounting arrangement 10 can accommodate very different distances 14 between the frame members 120, 121 in a simple manner. To permit such accommodation, the mounting arrangement 10 includes transverse mounting elements which are adjustable in length and are lockable when adjusted in length to a particular distance of the longitudinal frame members of a vehicle on which the loading platform is to be mounted.

The transverse mounting structure comprises in the embodiment as shown in FIGS. 1 to 9 two transverse mounting members 16, 17. The transverse mounting members 16, 17 are arranged in spaced parallel relationship (see FIGS. 8 and 9). As shown in the figures, the transverse mounting members have U-shaped cross-sections and comprise each three transverse member sections 160, 161, 162 and respectively, 170, 171, 172, which are longitudinally slidable relative to each other. The transverse mounting members 16, 17 or 160, 161 162 and respectively, 170, 171, 172 are so dimensioned that they can be moved one into another. Preferably, the center mounting member section 161, 171 is somewhat larger in cross-section than the outer sections 160, 162 and 170, 172 so that the outer sections can be received, and are slidably disposed in, the cavity formed by the center section 161, 171. The outer transverse mounting member sections 160, 170 and 162, 172 carry at their opposite ends 150, 151 attachment elements 152, 153 by which he center sections are interconnected. In the arrangement as shown, the attachment elements 152, 153 are endplates which include a plurality of holes 18 by way of which they can be connected to the frame members 120, 121 of the vehicle 13 by means of bolts or screws which are not shown in the drawings. It is in principle also possible to provide for the transverse mounting members 16, 17 individual attachment elements so that the transverse mounting members 16, 17 are not interconnected but are individually mounted to the longitudinal vehicle frame members 121, 120.

The transverse mounting frame member sections 161, 171 are joined by connecting elements 19 and 20 which may be part of the parallelogram-shaped platform lifting and tilting mechanism of the loading platform system. The lifting and tilting mechanisms includes platform lifting and, respectively, platform tilting actuators as described for example in EP-A-0 808 747 (U.S. Ser. No. 09/635,963).

The connecting elements 19, 20 are consequently a part of the loading platform system 11. They may be removably attached to the transverse support frame structure 15, that is, respectively, to the transverse support members 16, 17 forming the transverse support frame structure 15. However, the connecting elements 19, 20 may also be firmly connected to the transverse support members 16, 17 by welding. It is particularly advantageous if the center sections 161, 171 of the transverse support members 16, 17 have a length corresponding to the proper distance between the connecting elements and the connecting elements are attached to the center sections 161, 171. The outer sections 160, 170 and 162, 172 extend then from the center sections for connection of the support frame structure to the vehicle frame members.

The transverse support frame structure 15 or the transverse support members 16, 17 forming the transverse support frame structure 15 may be provided with locking structures cooperating with corresponding locking structures at the connecting elements 19, 20 of the loading platform system 11 for releasably connecting the transverse support members 16, 17 or, respectively, the transverse support frame structure 15 to the connecting elements 19, 20. In this way, the loading platform system 11 can be attached to the transverse support frame structure 15 after the support frame structure has been mounted to the frame members 120, 121 of the vehicle 13, without the need for any particular tools, simply by engagement of the locking structures. Such an arrangement is particularly advantageous when the loading platform system must be removed from the vehicle 13 for servicing and/or repairs. The described arrangement for rapid mounting or removal is not shown in detail.

Figure 10:
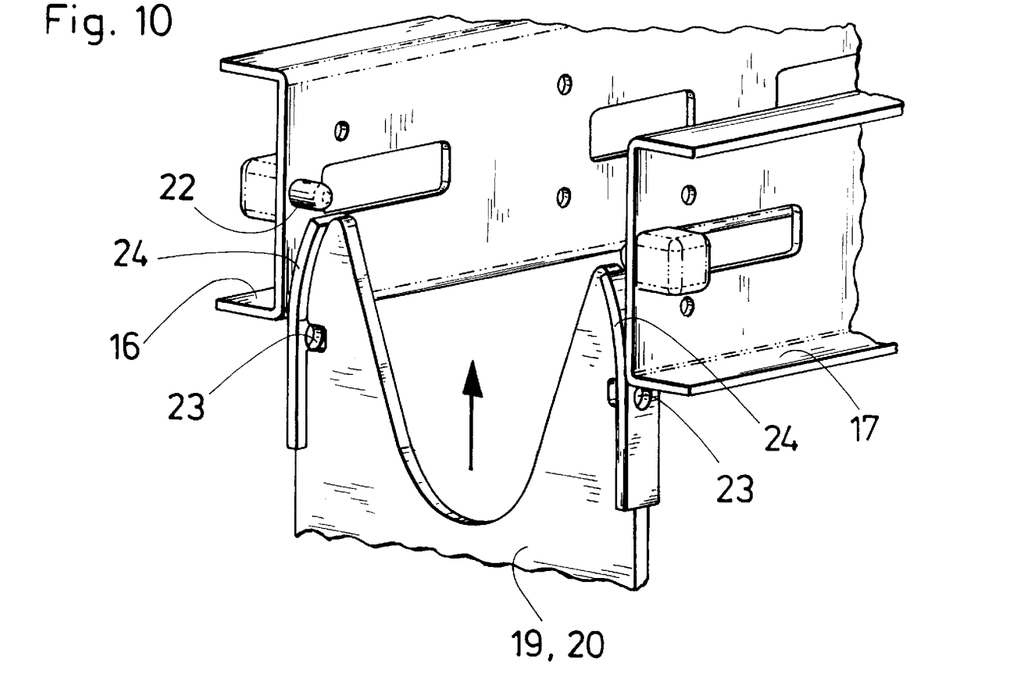
FIGS. 10 and 11 show an interlocking arrangement for mounting the loading platform system to the transverse frame members.
Figure 11:
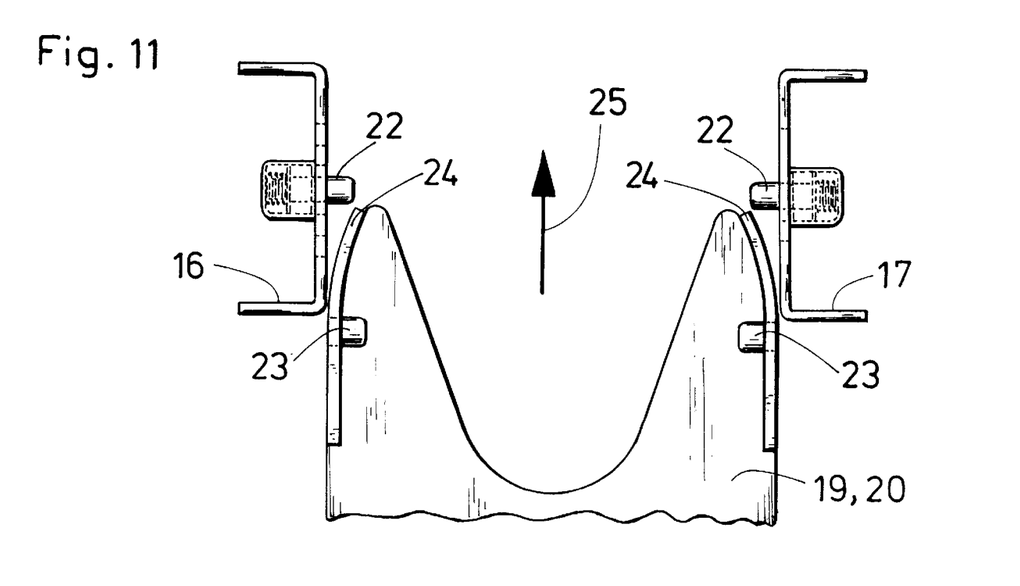

FIGS. 10 and 11 show a first embodiment for a loading platform mounting arrangement with interlocking projections 22 and cooperating engagement structures 23. At the upper free ends of the connecting elements 19, 20 curved slide elements 24 similar to the skids of a sled are arranged which are inclined toward each other so as to form a slide structure. Adjacent the curved ends of the slide structure, the slide elements 24, that is, in the area where the slide elements 24 extend parallel to each other, engagement structures 23 are provided which, in the embodiment shown, are apertures.

The connecting elements 19, 20 include corresponding interlocking structures 22, which are pin-like projections 22. The pin-like projections 22 are spring-biased to their projecting end positions in which they are shown in FIGS. 10 and 11. When the loading platform system 11 is moved, fully assembled, in the direction of the arrows 25, the pins 22, sliding along the slide elements 24, are pushed back by the slide elements 24 against the force of the springs 22' in the direction toward the transverse support member 16, 17.

When the engagement apertures 23 are in alignment with the interlocking pins 22, the pins 22 enter the engagement apertures 23 under the forces of the springs 28' for locking the connecting elements 19, 20 to the transverse frame members 16, 17. By way of unlocking means, which are not shown herein, the locking pins 22 can be retracted when the loading platform system 11 is to be removed from the vehicle.

Figure 12:
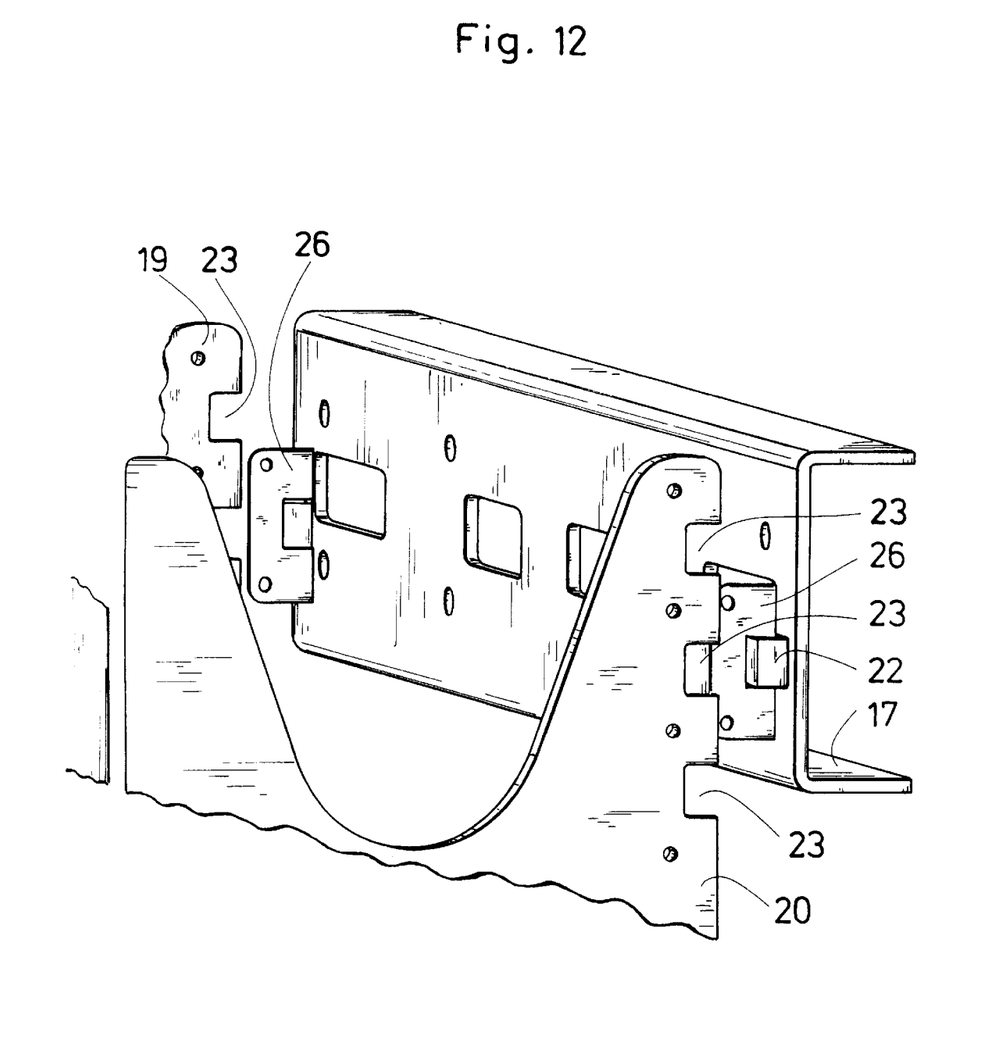
FIG. 12 shows another embodiment for removably interlocking the loading platform system with the transverse frame members.

In the embodiment shown in FIG. 12, the connecting elements 19', 20' are provided with engagement recesses 23' formed in the sides of the connecting elements so as to extend essentially parallel to the transverse frame members 16, 17 to form an engagement structure. The transverse frame members 16, 17 are provided with angled mounting elements 26, which are bolted or welded to the transverse frame members 16, 17. The mounting elements 26 include rectangular locking members 22' corresponding in shape to the engagement recesses 23' for snugly receiving the locking members 22' when the connecting elements 19', 20' are mounted to the transverse frame members 16, 17. Preferably, a plurality of engagement recesses 23' are provided in the connecting elements 19, 20 so that the mounting height of the loading platform system 11 can easily be adapted to the different heights of different types of vehicles without the need for adaptation structures.

The transverse support elements 160, 161, 162 and 170, 171 172 include a plurality of bores or holes 21 arranged longitudinally in spaced relationship. By way of these bores 21, the transverse support elements 160, 161, 162 and respectively, 170, 171, 172 can be firmly engaged with one another after the length of the transverse support members has been adjusted to the distance 14 between the frame members 120, 121 of the vehicle 13. The transverse support frame members are mounted to the vehicle frame members 120, 121 by way of the mounting elements 152, 153 by engagement means. After removal of the engagement means the mounting arrangement 10 can easily be removed from the vehicle 13.

What is claimed is:

1. An arrangement for mounting loading platform systems on the chassis or frame of trailers, semi-trailers or other vehicles having longitudinal vehicle frame members arranged in spaced relationship, said mounting arrangement including a transverse support frame structure comprising sections which are movable relative to each other so as to provide for an adjustable length of said transverse frame structure permitting adaptation of its length to the distance between said longitudinal vehicle frame members for mounting said transverse support frame structure to said longitudinal vehicle frame members, and means for mounting said loading platform system to said transverse support frame structure.

2. An arrangement according to claim 1, wherein said transverse support frame structure comprises at least two transverse support frame members arranged in parallel spaced relationship.

3. An arrangement according to claim 2, wherein said transverse support frame members are tubular frame members.

4. An arrangement according to claim 2, wherein said transverse support frame members have a U-shaped cross-section.

5. An arrangement according to claim 2, wherein said transverse support frame members consist each of a center section and two end sections slidably received in said center sections for adjustment of the length of said support frame members to the distance between the frame members of a vehicle, to which said transverse support frame structure is to be mounted and connecting elements are mounted to said center section in an essentially parallel spaced relationship, said loading platform system being supported on said connecting elements.

6. An arrangement according to claim 2, wherein said transverse support frame members consist of at least two sections which are arranged slidably in overlapping relationship for providing length adjustability of said transverse support frame members for adaptation of the length thereof to the distance between said vehicle frame members.

7. An arrangement according to claim 6, wherein said transverse support frame member sections extend one into the other.

8. An arrangement according to claim 6, wherein said at least two sections of said transverse support frame members include each a plurality of longitudinally arranged bores by way of which the two sections can be bolted together after their length has been adjusted to the distance between said vehicle frame members.

9. An arrangement according to claim 1, wherein said transverse support frame structure is provided at its opposite ends with mounting elements for mounting said transverse support frame structure to said vehicle frame members.

10. An arrangement according to claim 9, wherein said transverse support frame structure comprises two parallel spaced transverse support frame members which are interconnected by said mounting elements.

11. An arrangement according to claim 9, wherein said mounting elements are plate members.

12. An arrangement according to claim 9, wherein each of said mounting elements includes a plurality of bores for removably mounting said support frame structure to said vehicle frame members by means of screws extending through said bores.

13. An arrangement according to claim 1, wherein said transverse support frame structure comprises two parallel spaced transverse support frame members, which are interconnected by two spaced connecting elements and said loading platform system is connected to said connecting elements.

14. An arrangement according to claim 13, wherein said connecting elements are removably mounted to said transverse support frame structure by locking structures on said connecting elements and said transverse support frame structure, which locking structures cooperate to join said connecting elements to said transverse support frame structure.

15. An arrangement according to claim 13, wherein said connecting elements are removably mounted to said transverse support frame structure by bolted connections.

16. An arrangement according to claim 1, wherein said transverse support frame structure comprises two parallel spaced transverse support frame members, which are interconnected by two spaced connecting elements and said two spaced connecting elements are part of said loading platform system.

17. An arrangement according to claim 16, wherein said transverse support frame structure comprises two parallel spaced transverse support frame members which are interconnected by two spaced connecting elements, which are part of said loading platform system.

18. An arrangement according to claim 16, wherein said connecting elements are removably mounted to said transverse support frame structure by bolted connections.

* * * * *